(12) United States Patent
Miller et al.

(10) Patent No.: US 6,530,843 B2
(45) Date of Patent: Mar. 11, 2003

(54) CONSTANT VELOCITY JOINT VENT

(75) Inventors: Michael J. Miller, White Lake, MI (US); John Ramey, St. Clair Shores, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 0 days.

(21) Appl. No.: 09/904,787

(22) Filed: Jul. 13, 2001

(65) Prior Publication Data

US 2002/0025854 A1 Feb. 28, 2002

Related U.S. Application Data

(60) Provisional application No. 60/228,521, filed on Aug. 28, 2000.

(51) Int. Cl.[7] .............................................. F16D 3/224
(52) U.S. Cl. ........................ 464/145; 464/15; 464/906
(58) Field of Search ........................... 464/15, 17, 139, 464/140, 141, 142, 143, 144, 145, 146, 185, 902, 906, 175

(56) References Cited

U.S. PATENT DOCUMENTS

| | | | | |
|---|---|---|---|---|
| 3,403,696 A | * | 10/1968 | Pynchon | 137/516.13 |
| 3,858,412 A | * | 1/1975 | Fisher et al. | 464/15 |
| 4,224,808 A | * | 9/1980 | Gehrke | 464/175 |
| 4,319,467 A | * | 3/1982 | Hegler et al. | 464/15 |
| 4,392,838 A | * | 7/1983 | Welschof et al. | 464/175 |
| 4,508,522 A | * | 4/1985 | Numazawa et al. | 464/11 |
| 4,559,025 A | * | 12/1985 | Dore | 464/175 |
| 6,092,812 A | * | 7/2000 | Ursel et al. | 277/630 |
| 6,220,967 B1 | * | 4/2001 | Miller | 464/15 |

* cited by examiner

Primary Examiner—Lynne H. Browne
Assistant Examiner—Kenn Thompson
(74) Attorney, Agent, or Firm—Mick A. Nylander

(57) ABSTRACT

A constant velocity joint vent for use in a constant velocity joint. The vent includes a permeable membrane located within a chamber of the vent. The vent further includes a neck having a plurality of orifices thereabout, wherein the orifices allow gases to travel between an interior and exterior of the vent. The orifices also provide a secondary function of stopping any lubricant from entering and contaminating the permeable membrane of the vent system.

18 Claims, 3 Drawing Sheets

CONSTANT VELOCITY JOINT VENT

This application claims the benefit of Provisional application Ser. No. 60/228,521, filed Aug. 28, 2000.

TECHNICAL FIELD

The present invention generally relates to constant velocity joints and more particularly, to a vent for a constant velocity joint.

BACKGROUND ART

Constant velocity joints (CV joints) are common components in automotive vehicles. Typically, constant velocity joints are employed where transmission of a constant velocity rotary motion is desired or required. Common types of constant velocity joints are a plunging tripod, a fixed tripod, a plunging ball joint and a fixed ball joint. These types of joints currently are used in front wheel drive vehicles, or rear wheel drive vehicles and on the propeller shafts found in rear wheel drive, all wheel drive and four wheel drive vehicles. These constant velocity joints are generally grease lubricated for life and sealed by the use of sealing boots when used on drive shafts. Thus, constant velocity joints are sealed in order to retain grease inside the joint while keeping contaminants and foreign matter, such as dirt and water, out of the joint. To achieve this protection, the constant velocity joint is usually enclosed at the open end of the outer race by a sealing boot made of a rubber, thermoplastic, or silicone material. The opposite end of the outer race generally is enclosed by a dome or cap, known as a grease cap in the case of a disk type joint. A monoblock or integral stem and race design style does not use a grease cap, but is sealed by the internal geometry of the outer race. This sealing and protection of the constant velocity joint is necessary because contamination of the inner chamber may cause internal damage and destruction of the joint. Furthermore, once the inner chamber of the joint is lubricated, it is lubricated for life.

During operation, the constant velocity joint creates internal pressures in the inner chamber of the joint. These pressures have to be vented to the outer atmosphere in order to prevent pressure build-up which occurs during operation of the joint and may destroy the boot. If the pressure build-up is allowed to reach a critical state, the boot, protecting the joint from contaminants and water, may crack and deteriorate, or blow out, thus losing sealability. Generally speaking a constant velocity joint is usually vented by placing a small hole generally in the center of the grease cap or at least one hole around the outer periphery of the outer race. These prior methods of venting the gas are sometimes not adequate because if the constant velocity joint is in a static state and not rotating the lubricating grease may settle in the vent hole and block or hinder its function of venting any internal gas pressure. This type of vent may also allow the infiltration of contaminants. Once the internal pressure builds up the joint may fail due to a ruptured boot or other catastrophe. Furthermore, the constant velocity joint, after running for long periods of time, creates very high temperatures along with high pressures which are vented through the current vent holes. However, if the constant velocity joint is submerged or saturated in water or other contaminants, the water will, via vacuum, be sucked into the constant velocity joint, thus contaminating the grease lubricant and reducing the life of the constant velocity joint. Therefore, the ingress of water and other contaminants through the vent hole may reduce the life expectancy for the constant velocity joints.

Therefore, there is a need in the art for a constant velocity joint that will prevent the build up of internal gas pressure while eliminating the ingress of contaminants from entering the constant velocity joint.

BRIEF SUMMARY OF THE INVENTION

One object of the present invention is to provide an improved constant velocity joint.

Another object of the present invention is to provide a new vent solution for a constant velocity joint.

Yet a further object of the present invention is to provide a vent for a constant velocity joint that has a permeable membrane that allows gas to pass through to the atmosphere.

Still a further object of the present invention is to prevent the entry of contaminants into the constant velocity joint internal chamber.

Yet a further object of the present invention is to provide a vent for a constant velocity joint that equalizes the difference in the internal and external pressures of the constant velocity joint.

To achieve the foregoing objects a constant velocity joint vent for use in a constant velocity joint is disclosed. The constant velocity joint vent includes a permeable membrane located within a chamber of the vent. The vent further includes a neck having a plurality of orifices thereabout, wherein the orifices allow gases to travel between an interior and exterior of the vent.

One advantage of the present invention is that the constant velocity joint includes a vent that has a permeable membrane to the atmosphere.

A further advantage of the present invention is that the constant velocity joint vent will allow gas, which is under pressure, to escape from the internal joint chamber to the atmosphere and will allow gas to enter from the atmosphere to the internal chamber thus creating an equalized pressure variant.

Still another advantage of the present invention is that the constant velocity joint will stop the entry of contaminants into the constant velocity joint.

Other objects, features and advantages of the present invention will become apparent from the subsequent description and appended claims, taken in conjunction with the accompanying drawings.

BEST MODE FOR CARRYING OUT THE INVENTION

Figure 1:
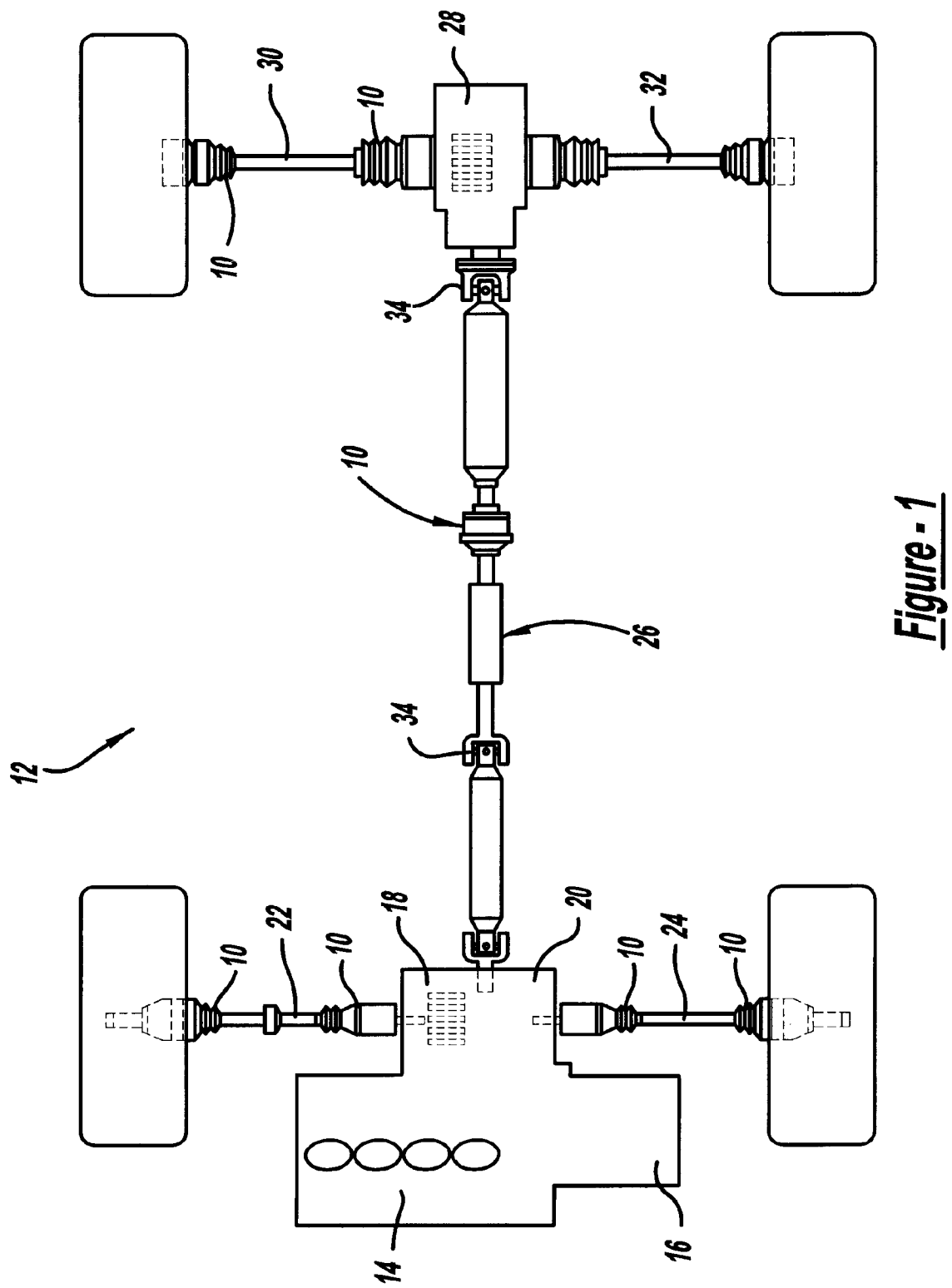
FIG. 1 shows a plan view of an all wheel drive vehicle drive line.

Referring to the drawings, a constant velocity joint 10 according to the present invention is shown. It should be noted that any type of constant velocity joint such as a plunging tripod, a fixed tripod, etc. may be used according to the present invention. The constant velocity joint 10 for the present invention includes a novel and improved method of venting the joint.

FIG. 1 shows a typical drive line 12 of an automotive vehicle. The drive line 12 shown in FIG. 1 can be a typical all wheel drive vehicle, however it should be noted that the constant velocity joints 10 of the current invention can also be used in rear wheel drive only vehicles, front wheel drive only vehicles, all wheel drive vehicles, and four wheel drive vehicles. The drive line 12 includes an engine 14 that is connected to a transmission 16 and a power take off unit 18. The front differential 20 has a right hand side shaft 22 and left hand side shaft 24 each of which are connected to a wheel and deliver power to the wheels. On both ends of the right hand front half shaft 22 and left hand front half shaft 24 are constant velocity joints 10. A propeller shaft 26 connects the front differential 20 to the rear differential 28, wherein the rear differential 28 includes a rear right hand side shaft 30 and a rear left hand side shaft 32, each of which ends with a wheel on one end thereof. A CV joint 10 is located on both ends of the half shaft that connect to the wheel and the rear differential 28. The propeller shaft 26, shown in FIG. 1, is a three piece propeller shaft that includes a plurality of cardan joints 34 and one high speed constant velocity joint 10. The constant velocity joints 10 transmit power to the wheels through the drive shaft 26 even if the wheels or the shaft 26 have changing angles due to steering, raising or lowering of the suspension of the vehicle. The constant velocity joints 10 may be of any of the standards types known, such as a plunging tripod, the cross groove joint, a fixed joint, a fixed tripod joint, or double off set joint, all of which are commonly known terms in the art for different varieties of constant velocity joints 10. The constant velocity joints 10 allow for transmission of constant velocities at angles which are found in every day driving of automotive vehicles in both the half shafts and prop shafts of these vehicles.

Figure 2:
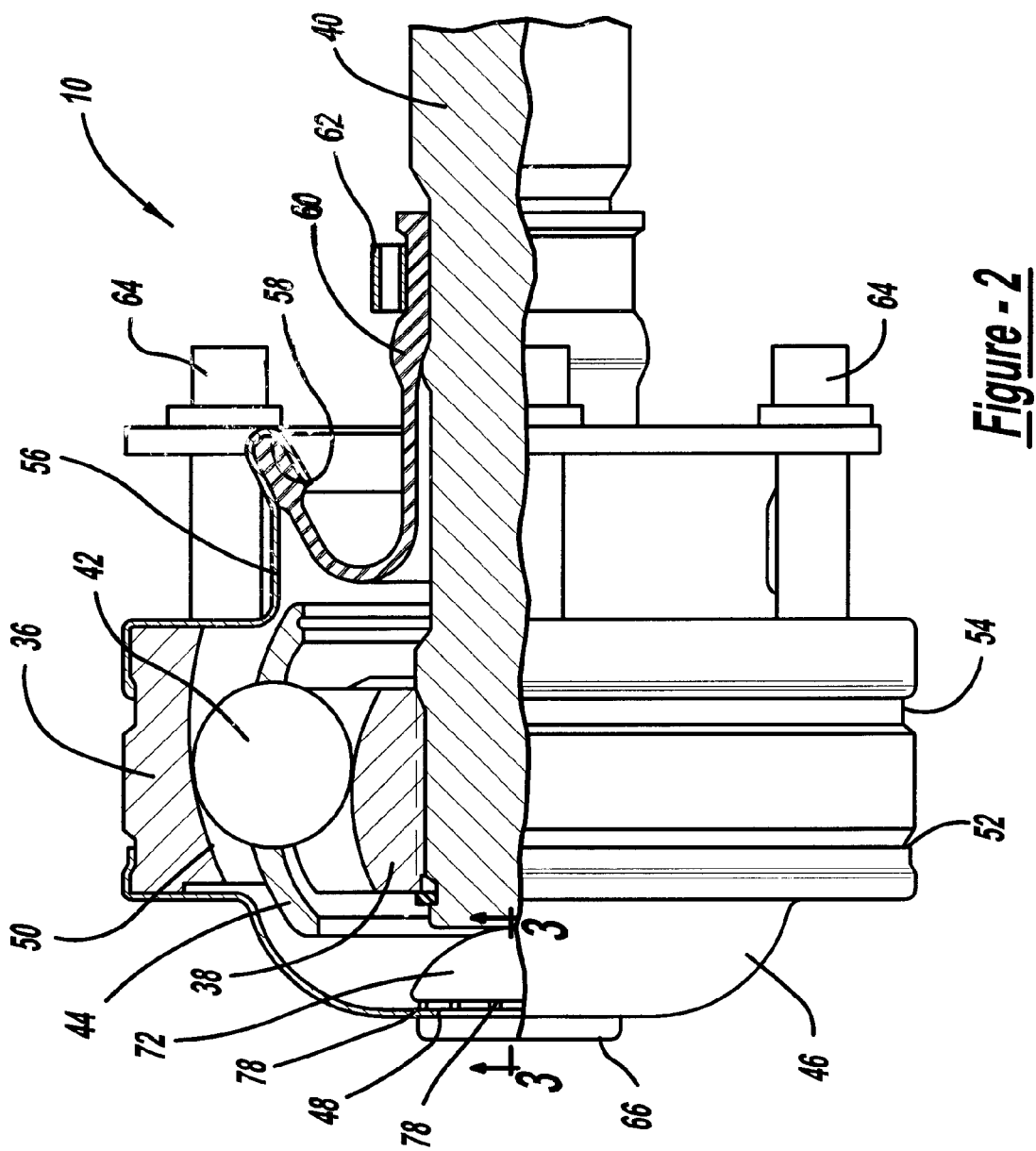
FIG. 2 shows a cross section of a constant velocity joint with a vent according to the present invention.

FIG. 2 shows a preferred embodiment of the present invention. The constant velocity joint 10 includes an outer race 36 that has an inner race 38 located within its circumference. The inner race 38 is connected to a shaft 40. A race ball 42 is in contact with both the inner surface of the outer race 36 and an outer surface of the inner race 38. The race ball 42 is held in place by a cage 44. On one end of the outer race 36 is located an end cap 46 which is made of a metal in the preferred embodiment but it should be noted that any other type of hard plastic, ceramic or any other hard material may be used. The end cap 46 includes an orifice 48 at a center portion thereof. A seal 50, which in the preferred embodiment is made of a cork material, however, it should be noted that any other type of material may be used, is located between the end cap 46 and the outer race 36. An outside surface of the outer race 36 also includes two grooves (52, 54) therein. The first groove 52 receives an end of the end cap 46 and allows for crimping of the end cap onto the outer race 36. On the opposite end of the outer race 36 is located the boot cover 56 which is crimped into the second groove 54 on the outer race surface. The boot cover 56 includes a channel 58 on a periphery thereof. Within the channel 58 is one end of the boot 60 which is made of a neoprene material, however, it should be noted that any other type of soft rubber like or composite material may also be used. The opposite end of the boot 60 is secured to the shaft 40 by a clamp 62 or other available securing methods. A plurality of fasteners 64 are used to hold the outer race 36 to a body portion of the constant velocity joint 10. In the preferred embodiment the fasteners 64 are bolts but any other type of securing means known in the art may be used.

Figure 3:
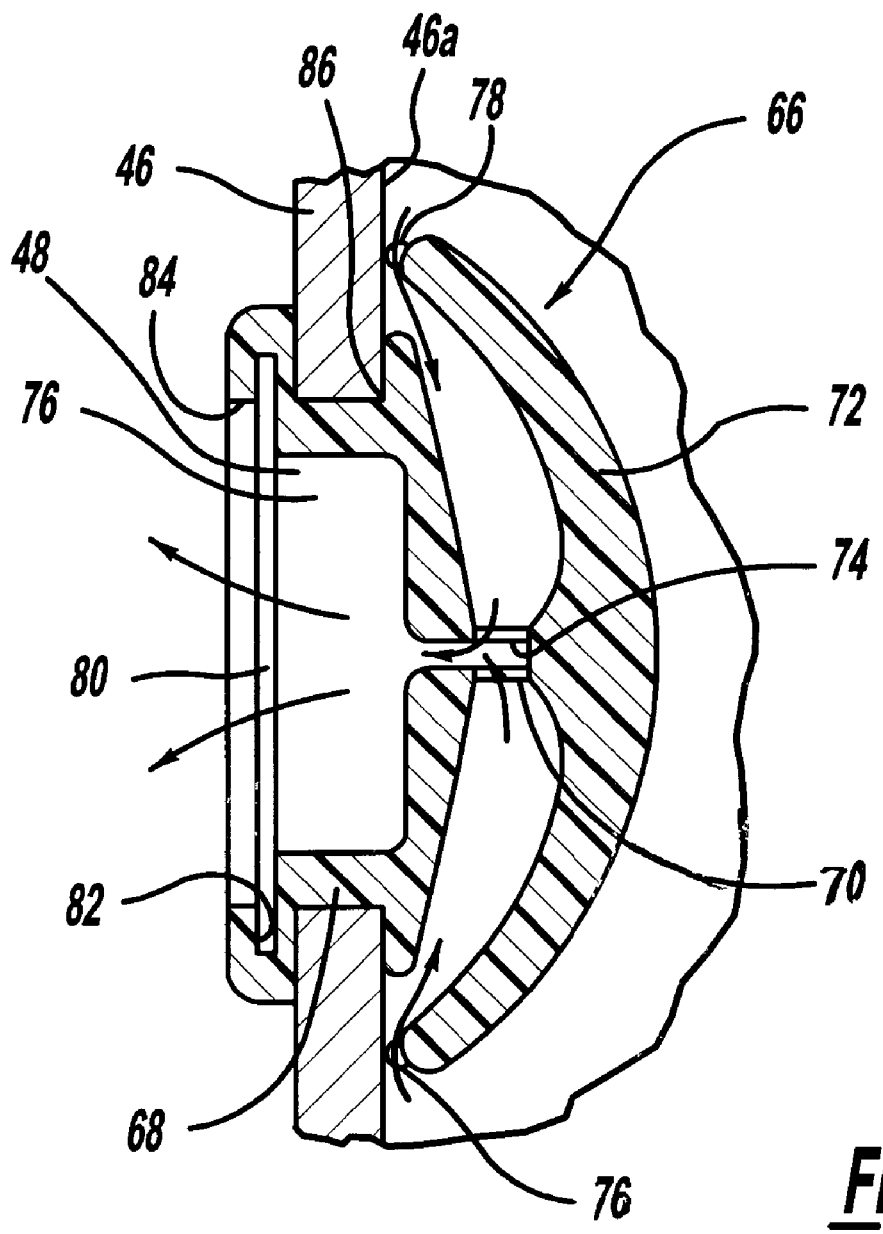
FIG. 3 shows a cross section of the vent according to the present invention.

Secured to one end of the end cap 46 is a vent 66 according to the present invention. FIG. 3 shows a close up of the vent 66 in cross section. The vent 66 is secured within the orifice 48 which is at a center point of the end cap 46. The vent 66 is connected to the end cap 46 in the orifice 48 via a body portion 68. The body portion 68 includes an integral neck 70 connected on one end thereof. The neck 70 is further connected on an end opposite from the body 68 to a shield 72. The shield 72 generally has an umbrella shaped configuration. The neck 70 is located at a center point of the vent 66 and includes at least one orifice 74 therein, which will allow for the flow of gases into and out of the chamber 76 formed within the body of the vent 66. The shield 72 has a plurality of nib members 78 located at the outer periphery of its umbrella shape. These nib members 78 are in contact with an inside surface 46a of the end cap 46 of the constant velocity joint 10. The nibs 78 are spaced evenly around the outer periphery of the shield such that gases may flow around the nibs 78 and under the end of the shield 72 into and through the orifices within the neck 70 of the vent 66. The gases that flow through the neck 70 into the chamber 76 within the body portion of the vent 66 are then disbursed through a permeable membrane 80 which is secured within the chamber 76 of the body. In the preferred embodiment the membrane 80 is molded within a channel 82 of the body member. The body member 68 also includes an orifice 84 through which the pressurized and hot gas in the internal chamber of the constant velocity joint 10 will vent through the permeable membrane 80. The permeable membrane 80 will stop or repel the ingress of any contaminants, such as water or grime, into the vent 66 and further on into the internal chamber of the constant velocity joint 10. The body member 68 also includes a groove 86 around its outer periphery thereof, where the body member 68 will be secured to the orifice 48 within the end cap via the groove 86 in the body member. In the preferred embodiment the vent 66 is made of a plastic material, preferably a nylon, but it should be noted that any other type of ceramic, hard or soft plastic or rubber material may be used for the vent 66 depending on the needs and requirements of the operating environment of the vent. It should further be noted that the permeable membrane 80 in the preferred embodiment is an expanded polytetrafluoroethylene polymer that is saturated with an oleo phobic polymer to create the barrier that will allow for the passage of heated and pressurized gas from the internal chamber of the constant velocity joint 10 to pass through which will equalize any internal pressures but prevent the entry of contaminants such as water and road grime into the constant velocity joint 10. As shown in FIG. 3 by the arrows, pressurized air and gases will travel underneath the shield 72 and around the nib 78 into the orifices 74 on the neck 70 of the vent 66 and through the neck 70 into the chamber 76 of the body 68 through the permeable membrane 80 out into the atmosphere in order to equalize the pressure within the joint.

In operation the constant velocity 10 joint is filled with a lubricant to reduce the internal temperature and lubricate the moving parts within the constant velocity joint 10. In the preferred embodiment the lubricant is a grease which is placed within an inner chamber of the constant velocity joint 10 and is sealed thereafter via the boot cover 56 and boot 60. When the constant velocity joint 10 is spinning at its high speeds, the boot 60 may rupture prematurely because there is no venting of the internal pressure of the joint which results in failures of the boot 60 and constant velocity joint 10. Current constant velocity joints tend to use a venting hole in the center of an end cap which works fine for equalizing joint pressure but is insufficient in obstructing water and contaminants from entering the joint and also is easily plugged by the lubricant within the joint. Therefore, at these high pressures and temperatures within the constant velocity joint the vent mechanism must be able to equalize the internal and external pressure differences while stopping the ingress of contaminants from entering the constant velocity joint. The current vent 66 uses the permeable membrane 80 which will allow air to flow freely in both directions to the inside and outside of the constant velocity joint. However, the permeable membrane 80 includes a pore size that will repel any water or contaminants that try to enter the constant velocity joint from the external environment.

The vent 66 is also designed such that the shield 72 will prevent grease from making direct contact with the permeable membrane 80 and decreasing the membranes ability to allow gases and air to leave and enter the vent appropriately. Any grease that does contact the permeable membrane 80 will inhibit its function of allowing air to flow freely in both directions and repelling water and contaminants from entering into the constant velocity joint 10. Thus, the shield 72 prevents any grease from entering and contacting the permeable membrane 80. Specifically, as a constant velocity joint rotates centrifugal forces will be built up within the joint such that grease will tend to migrate to the outer most part of the joint. However, when the grease comes in contact with the shield, the umbrella design will deflect the grease away from the permeable membrane 80 but still allow the high pressurized gas to flow freely under the umbrella 72 and around the nibs 78 of the shield 72. This air will then enter the space between the body 68 and underside of the shield and flow through the orifices within the neck 70 into the chamber 76 of the body and out of the joint via the permeable membrane 80. If the vehicle in which the constant velocity joint is used is saturated or submersed in water, any water or contaminants will be repelled by the permeable membrane and kept from entering the vent and thus the internal chamber of the constant velocity joint which will increase the life of the boot 60 and constant velocity joint 10. Keeping water or grime from entering the constant velocity joint 10 will also increase the life of the grease. The grease tends to break down with the advent or mixture of water or dirt and when the grease breaks down the internal temperatures and pressures will increase. It should be noted that most prior art constant velocity joints had a variety of methods of venting high pressure gas of the joints, however, if the vehicles were submerged or saturated in water and/or other contaminants, the water would be sucked into the chambers via a vacuum and the constant velocity joint would be contaminated by water, or grime and increases in heat and pressure would create a situation of boot failure by either a rupture of the boot or a crack in the boot thus, leading to a complete failure of the constant velocity joint. Therefore, the vent solution overcomes these problems by using a permeable membrane that will not allow water, contaminants into the chambers of the constant velocity joints, but will allow the venting of high pressure and high temperature gas to further increase the life of the constant velocity joint.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced otherwise than as specifically described.

What is claimed is:

1. A constant velocity joint vent comprising:
   a permeable membrane located within a chamber of the constant velocity joint vent;
   a neck having a plurality of orifices formed therein, said orifices allowing gases to travel between an interior and exterior of the vent; and
   a shield connected to one end of said neck, said shield configured to protect said permeable membrane from contacting lubricant within said constant velocity joint.

2. The vent of claim 1 wherein said shield generally has an umbrella shape.

3. A constant velocity joint vent comprising:
   a permeable membrane located within a chamber of the constant velocity joint vent;
   a neck having a plurality of orifices thereabout, said orifices allowing gases to travel between an interior and exterior of the vent; and
   a shield connected to one end of said neck, said shield generally having an umbrella shape,
   wherein said shield includes a plurality of nibs located on an outer periphery of said umbrella.

4. The vent of claim 3 wherein said nibs are equally spaced around said outer periphery, said nibs allow gases to flow freely to said neck.

5. The vent of claim 1 further including a body, said body is integral with one side of said neck.

6. The vent of claim 5 wherein said chamber is defined by said body.

7. The vent of claim 5 wherein said permeable membrane is connected to an inside surface of said body.

8. The vent of claim 5 wherein said body includes at least one orifice.

9. The vent of claim 1 wherein said shield is a solid plastic material.

10. A vent for use on a constant velocity joint, said constant velocity joint having a lubricant and a cover on one end thereof, said vent including:
    a body in contact with the cover and supporting a permeable membrane;
    a neck integral with said body, said neck having at least one orifice therein; and
    a shield member connected to said neck on a side opposite of said body, said shield member protecting said permeable membrane from being contaminated by the lubricant.

11. The vent of claim 10 wherein said shield member generally has an umbrella shape.

12. A vent for use on a constant velocity joint, said constant velocity joint having a lubricant and a cover on one end thereof, said vent including:
    a body in contact with the cover;
    a neck integral with said body, said neck having at least one orifice therein; and
    a shield member connected to said neck on a side opposite of said body, said shield member generally having an umbrella shape,
    wherein said shield member includes a plurality of nibs spaced about a perimeter of said shield member.

13. The vent of said claim 10 further including a chamber defined in part by said body.

14. The vent of claim 13 wherein said permeable membrane is attached within said chamber.

15. The vent of claim 14 wherein said permeable membrane allows gases to flow to exterior of the constant velocity joint and prevents the ingress of contaminants into the interior of the constant velocity joint.

16. The vent of claim 12 wherein gases flow around said nibs said through said orifices in said neck into a permeable membrane and then to the exterior of the constant velocity joint.

17. The vent of claim 10 wherein said body includes at least one orifice that vents to an exterior of the constant velocity joint.

18. A constant velocity joint for use in a vehicle, said constant velocity joint having an internal chamber under pressure with relation to the atmosphere, said constant velocity joint including:

a cover on one end thereof;

a boot on an end opposite of said cover; and a vent located at a center of said cover, said vent having a body in contact with said cover, said vent having a neck integral with said body, said neck having a plurality of orifices therein, said vent having a shield connected to said neck opposite of said body, said shield having a plurality of nibs that are in contact with said cover, said vent equalizes pressure of gases between the internal chamber of the constant velocity joint and the atmosphere.

* * * * *

UNITED STATES PATENT AND TRADEMARK OFFICE
CERTIFICATE OF CORRECTION

PATENT NO.    : 6,530,843 B2  Page 1 of 1
DATED         : March 11, 2003
INVENTOR(S)   : Michael J. Miller and John Ramey It is certified that error appears in the above-identified patent and that said Letters Patent is hereby corrected as shown below:

<u>Column 7,</u>
Line 4, delete the first "said" and insert -- and --

Signed and Sealed this

Eighth Day of July, 2003

JAMES E. ROGAN
*Director of the United States Patent and Trademark Office*